United States Patent
Shingai et al.

(10) Patent No.: US 7,943,223 B2
(45) Date of Patent: May 17, 2011

(54) OPTICAL RECORDING MEDIUM AND RECORDING FILM MATERIAL

(75) Inventors: Hiroshi Shingai, Tokyo (JP); Tatsuya Kato, Tokyo (JP); Masanori Kosuda, Tokyo (JP); Hiroshi Takasaki, Tokyo (JP); Hideki Hirata, Tokyo (JP); Jajime Utsunomiya, Tokyo (JP)

(73) Assignee: TDK Corporation, Tokyo (JP)

( * ) Notice: Subject to any disclaimer, the term of this patent is extended or adjusted under 35 U.S.C. 154(b) by 321 days.

(21) Appl. No.: 12/076,070

(22) Filed: Mar. 13, 2008

(65) Prior Publication Data

US 2008/0239934 A1    Oct. 2, 2008

(30) Foreign Application Priority Data

Mar. 27, 2007  (JP) ................................. 2007-082929
Jan. 21, 2008  (JP) ................................. 2008-011000

(51) Int. Cl.
*B32B 3/02* (2006.01)

(52) U.S. Cl. ..................... 428/64.1; 428/64.4; 428/64.5; 428/64.6; 430/270.13

(58) Field of Classification Search .......................... None
See application file for complete search history.

(56) References Cited

U.S. PATENT DOCUMENTS

| 7,018,698 | B2 * | 3/2006 | Mizuno et al. | 428/64.1 |
| 7,081,289 | B2 * | 7/2006 | Ohno et al. | 428/64.1 |
| 7,407,697 | B2 * | 8/2008 | Nishihara et al. | 428/64.1 |
| 7,760,615 | B2 * | 7/2010 | Shinngai et al. | 369/275.2 |
| 7,846,525 | B2 * | 12/2010 | Tsuchino et al. | 428/64.1 |
| 7,858,166 | B2 * | 12/2010 | Nakai et al. | 428/64.1 |
| 2006/0114805 | A1 * | 6/2006 | Shingai et al. | 369/275.1 |

FOREIGN PATENT DOCUMENTS

JP    A-2004-306595    11/2004
JP    B-3899770    3/2007

* cited by examiner

*Primary Examiner* — Elizabeth Mulvaney
(74) *Attorney, Agent, or Firm* — Oliff & Berridge, PLC

(57) ABSTRACT

An optical recording medium is provided which includes two or more information layers in which an Sb-based eutectic material is used as the material for a recording film of a translucent information layer. There is also provided a recording film material for the optical recording medium. The translucent information layer is configured to include a recording film formed of a phase change material $Sb_xGe_yIn_z$ containing Sb, Ge, and In in an atomic ratio of x:y:z, where $5 \leq y \leq 15$ and $4 \leq z \leq 15$ are satisfied. The recording film further includes Te in an atomic ratio of a, provided that $x+y+z+a=100$ and $4 \leq a \leq 15$ are satisfied. An interface layer formed of a $ZrO_2$—$Cr_2O_3$ film having a thickness of 2 nm or more and 10 nm or less is provided on the laser beam incident side of the recording film. When the compositional ratio of the $ZrO_2$—$Cr_2O_3$ film is given by $ZrO_2:Cr_2O_3=B:C$ (mol %), $20 \leq B \leq 90$, $10 \leq C \leq 80$, and $B+C=100$ are satisfied.

7 Claims, 4 Drawing Sheets

OPTICAL RECORDING MEDIUM AND RECORDING FILM MATERIAL

BACKGROUND OF THE INVENTION

1. Field of the Invention

The present invention relates to an optical recording medium referred to as a next generation DVD (Digital Versatile Disc). In particular, the invention relates to an optical recording medium having two or more information layers formed of a phase-change material and to a recording film material for the optical recording medium.

2. Description of the Related Art

For example, Blu-ray (trademark) discs (hereinafter abbreviated as BDs) have been proposed as next generation DVDs. For the BDs, an optical system is used which uses a recording-reproduction laser beam having a wavelength of 405 nm (blue) and an objective lens having a numerical aperture NA of 0.85 ($\lambda/NA \leqq 500$ nm).

In optical disc drives for BDs or the like, a single-mode oscillation diode laser is used, and high frequency modulation for a reproduction beam is performed at a frequency of several hundred MHz in order to reduce laser noise during signal reproduction. Generally, the conditions for high frequency modulation are a frequency of 300 to 500 MHz, a Ratio of 3 to 8, and a pulse width of 200 to 400 psec.

For BDs, rewritable optical recording media have been proposed which have two or more information layers on one side. In such optical recording media, information layers other than an information layer (L0 layer) located farthest from a laser beam incident surface must be translucent information layers that are translucent to the wavelength of a recording-reproduction laser beam, in order to allow the laser beam directed to the L0 layer to pass therethrough. For example, in dual-layer optical recording media, an L1 layer other than the information layer (L0 layer) located farthest from the laser beam incident surface is a translucent information layer. Therefore, the reflectivity from the L1 layer is low, and the reflectivity from the L0 layer is also low because the laser beam is incident on and reflected from the L0 layer through the L1 layer. In such dual-layer optical recording media, the reflectivity is lower than that of single-layer optical recording media. Accordingly, the power of the reproduction laser beam must be increased to ensure a sufficient amount of light reaching a pickup.

Moreover, the laser beam used for BDs has a shorter wavelength than that used for DVDs, and an objective lens having a high NA is used in the BDs, whereby a spot size is reduced. Therefore, the energy density at the laser spot is very high.

Furthermore, as described above, since the L1 layer in the dual-layer optical recording media must be a translucent information layer, the thickness of a metal reflection film must be reduced. Therefore, the heat generated by the laser beam irradiated onto the recording film of the L1 layer is not sufficiently dissipated from the reflection film, so that the cooling rate in the L1 layer is lower than that in the L0 layer, i.e., the L1 layer has a slow-cooling structure.

Moreover, when the linear velocity during recording is increased to perform high-speed recording, i.e., when the rotation speed of the disc is increased, the pickup cannot easily follow grooves on the disc, and therefore servo control is not stabilized. Hence, when high-speed recording is performed, the reproduction power must be increased to stabilize the servo control.

Accordingly, in the translucent information layers in next generation DVDs having two or more information layers, recorded signals deteriorate due to the reproduction beam, so that the reproduction durability significantly deteriorates. This problem is caused by the following four main reasons: high reproduction power, high energy density at a small size spot, the slow-cooling structure in the translucent information layers, and high-speed recording.

Moreover, the high frequency modulation is performed on the reproduction beam. Therefore, the higher the Ratio (the ratio between the maximum power and the minimum power) in the high frequency modulation, the higher the peak power of the reproduction beam, so that the temperature increase in the portion irradiated with the reproduction beam becomes significant. Since a high-power reproduction beam under high frequency modulation at high Ratio is used in BDs, it is more difficult to achieve sufficient reproduction durability in the BDs than in DVDs.

In particular, in rewritable phase-change optical recording media, amorphous marks serving as recorded signals can be crystallized when irradiated with a high-power laser beam during reproduction, so that the recorded signals are likely to be lost. This problem is particularly significant in Sb-based eutectic phase-change materials containing Sb as a main component.

Conventionally, it has therefore been difficult to use an Sb-based eutectic material as the material for a recording film of a translucent information layer in rewritable multi-layer optical recording media for BDs.

When such an Sb-based eutectic material is used as the material for the recording film of the translucent information layer in the rewritable multi-layer BDs, a margin for recording strategy when recording is performed is reduced. Specifically, the following problems may occur:

With an Sb-based eutectic material, the crystallization speed of the recording film can be easily increased. However, a high-cooling rate is required when amorphous marks are formed by using a recording laser beam. If the cooling rate is not sufficiently high, recrystallization occurs during cooling after the melting of the recording film, so that the formation of the amorphous marks may be insufficient.

In view of the above, the cooling rate after the melting of the recording film must be increased by changing the structure of the medium to a rapid-cooling type structure or by narrowing the pulse width for forming the amorphous marks in the recording strategy.

However, in the translucent information layers in the multi-layer BDs, the thickness of the recording film or reflection film must be reduced in order to allow the recording-reproduction beam to pass therethrough. Therefore, the remaining heat is not dissipated sufficiently, and the translucent information layers have a slow-cooling structure in which the cooling rate is lower than that in a total reflection information layer (L0 layer). Accordingly, the formation of the amorphous marks may be insufficient.

Moreover, when a laser beam is generated, the required rise and fall time periods for the beam generation are approximately 1.5 nsec to approximately 3 nsec. Hence, if the pulse width of the laser beam is set shorter than the above beam generation time periods, the laser beam cannot be generated. Accordingly, the recording film is required to have the ability to allow recording with a pulse width larger than the above time periods.

However, with an Sb-based eutectic material, a high-cooling rate is required as described above. Therefore, when recording is performed by using a recording strategy with a large pulse width, recrystallization occurs, so that it is difficult to perform the recording correctly.

In order to solve the above problems, in Japanese Patent Application Laid-Open No. 2004-306595 and Japanese Patent No. 3899770, a lanthanoid element is added to a phase-change material. However, in these inventions, sufficient reproduction durability is difficult to be achieved at a high reproduction power in an optical system with $\lambda/NA \leq 500$ nm.

SUMMARY OF THE INVENTION

In view of the foregoing problems, various exemplary embodiments of this invention provide a next generation optical recording medium serving as a next generation DVD. Specifically, the optical recording medium is excellent in reproduction durability at a high reproduction power and has a wide margin for recording strategy even when recording is performed under the condition of $\lambda/NA \leq 500$ nm and an Sb-based eutectic material is used in a translucent information layer. Various exemplary embodiments of this invention also provide a recording film material for the above optical recording medium.

The present inventor has made intensive studies on next generation optical recording media having two or more information layers. Specifically, a part of Sb in an Sb-based eutectic material serving as the material for a recording film of a translucent information layer is substituted with Te. In addition, a layer adjacent to the recording film is formed to contain at least Cr and O, and the thickness of each layer of the optical recording medium is optimized. In this case, the inventor has found that the thermal stability of amorphous marks can be improved and that the reproduction durability can also be improved. Moreover, the difference in reflectivity between crystalline and amorphous states becomes large, and the transmittance is increased. Furthermore, a margin for recording strategy when recording is performed can be increased.

In the optical recording medium of the present invention, a part of Sb in the Sb-based eutectic material used as the recording film material is substituted with Te. In this manner, a translucent information layer can be provided which allows high-speed recording and a wide margin for recording strategy and is excellent in reproduction durability at a high reproduction power. In addition, a recording film material that constitutes the above translucent information layer can be provided.

DETAILED DESCRIPTION OF THE PREFERRED EMBODIMENTS

Figure 1:
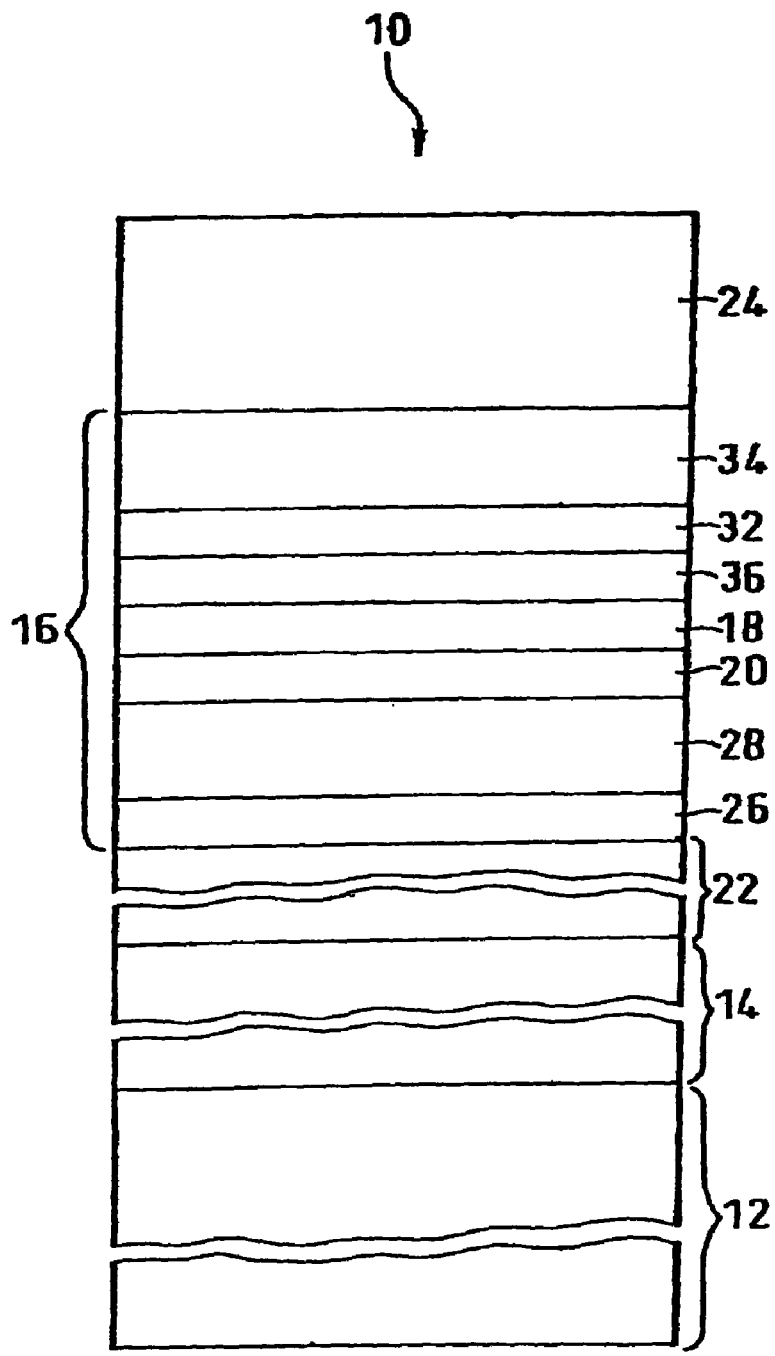
FIG. 1 is a cross-sectional view schematically illustrating an optical recording medium according to an exemplary embodiment of the present invention.

An optical recording medium according to the best mode includes: a substrate; a first information layer (L0 layer) which is provided on a laser beam incident surface side of the substrate; and at least one translucent information layer (L1 layer) which is provided on the laser beam incident surface side and is located farther away from the substrate than is the first information layer. The translucent information layer is configured to include a recording film formed of a recording film material $Sb_xGe_yIn_z$ containing Sb, Ge, and In in an atomic ratio of x:y:z, where $5 \leq y \leq 15$ and $4 \leq z \leq 15$. This recording film material is a phase change material. The recording film is rewritable through phase change between a crystalline state and an amorphous state, the phase change being caused by using an optical system with $\lambda/NA \leq 500$ nm, where NA is a numerical aperture of an objective lens and $\lambda$ is a wavelength of a laser beam. The recording film material further includes Te in an atomic ratio of a, provided that $x+y+z+a=100$ and $4 \leq a \leq 15$.

For example, the translucent information layer is configured by depositing a first dielectric layer, a reflection layer, a protection layer, the recording film (layer), an interface layer, a second dielectric layer, and a heat sink layer in this order on the substrate.

The first dielectric layer is provided for protecting the reflection layer and for adjusting the light transmittance. No particular limitation is imposed on the material for the first dielectric layer, and examples of such a material include oxides, nitrides, sulfides, carbides, and fluorides containing at least one metal selected from among Ti, Zr, Hf, Ta, Si, Al, Mg, Y, Ce, Zn, In, Cr, Nb, and the like, and compositions thereof. In the best exemplary embodiment, the first dielectric layer is formed of a material containing zirconium oxide ($ZrO_2$) as a main component or of $TiO_2$. Preferably, the first dielectric layer is formed of $TiO_2$ or a material containing $ZrO_2$, $Cr_2O_3$, and $Al_2O_3$. As used herein, the main component refers to that the molar ratio thereof to the total moles of all the components is 50% or more. The thickness D1 of the first dielectric layer is preferably $5 \text{ nm} \leq D1 \leq 60 \text{ nm}$. When the thickness D1 is less than 5 nm, the protection of the reflection layer is insufficient. When the thickness D1 is greater than 60 nm, the light transmittance falls outside a preferred range. Moreover, the first dielectric layer may be formed by depositing two or more dielectric layers. In such a case, it is preferable to use a dielectric material having a low refractive index on the substrate side and to use a dielectric material having a high refractive index on the reflection film side. For example, a material containing $ZrO_2$ as a main component is used as the dielectric material having a low refractive index, and titanium oxide ($TiO_2$) is used as the dielectric material having a high refractive index.

The reflection layer is provided for exerting heat dissipation and light interference effects. Preferably, an Ag alloy is used as the material for the reflection layer. The thickness Tr of the reflection layer is $0 \text{ nm} < Tr < 30 \text{ nm}$ in order to allow the information layer to have a translucent structure. In order to obtain optimal reflectivity and light transmittance, the thickness Tr is preferably $8 \text{ nm} \leq Tr \leq 16 \text{ nm}$. When the thickness Tr of the reflection layer is 0 nm, the heat dissipation effect is not obtained. When the thickness Tr is 30 nm or more, the transmittance is reduced, so that recording is difficult to be performed on the L0 layer.

The protection layer protects the recording film and dissipates heat to the reflection layer. The material for the protection layer contains at least Cr and O. The protection layer is preferably formed of Cr, Zr, and O and more preferably formed of at least $Cr_2O_3$ and $ZrO_2$. $Cr_2O_3$ increases crystallization speed, and $ZrO_2$ decreases film stress. When the ratio of $Cr_2O_3$ is high, the crystallization speed can be easily increased. However, when the ratio of $Cr_2O_3$ is too high, the light transmittance is reduced. The preferred ratio of $Cr_2O_3$ constituting the protection layer on the laser beam incident surface side is 10 mol % or more and 80 mol % or less, and the preferred ratio of $ZrO_2$ is 20 mol % or more and 90 mol % or less. The preferred ratio of $Cr_2O_3$ constituting the protection layer on the reflection layer side is 5 mol % or more and 70 mol % or less, and the preferred ratio of $ZrO_2$ is 30 mol % or more and 95 mol % or less. Preferably, stabilized $ZrO_2$ containing a rare earth oxide in an amount of several mole percent is used as the above defined $ZrO_2$. $Y_2O_3$ is preferred as the rare earth oxide, and the ratio of $Y_2O_3$ in 100 mol % of the stabilized $ZrO_2$ is 2 mol % or more and 10 mol % or less. Preferably, the ratio of $Cr_2O_3$ is higher in the laser beam incident surface side protection layer in contact with the recording film (layer) than in the reflection layer side protection layer. The preferred thickness of the protection layer is 3 nm or more and 10 nm or less.

The preferred thickness Trec of the recording film (layer) is $3\ nm \leq Trec \leq 7\ nm$. When the thickness Trec is less than 3 nm, the crystallization speed is decreased, and therefore it is difficult to erase (crystallize) amorphous marks. When the thickness Tres is greater than 7 nm, the transmittance is decreased, so that recording is difficult to be performed on the L0 layer. Moreover, as the thickness of the recording film increases, an excessive amount of heat is accumulated in the recording film itself when recording is performed, so that the recording characteristics deteriorate.

According to the manner described above, the beam transmittance of the translucent information layer as a whole is adjusted to 30% or more and 80% or less at a recording wavelength. This is because, when the beam transmittance of the translucent information layer is 30% or less, recording is difficult to be performed on an information layer located farthest from the laser beam incident surface and because, when the beam transmittance exceeds 80%, recording is difficult to be performed on the translucent information layer. The above condition is a typical condition required for the translucent information layer.

The recording film (layer) is formed of at least Sb, Ge, and In. In addition, a part of Sb is substituted with Te. Moreover, the recording film (layer) may contain at least one additional component selected from among Mg, Al, Si, Mn, Zn, Ga, Sn, Bi, and the like.

The interface layer controls the crystallization speed and reproduction durability of the recording film. The material for the interface layer contains at least Zr, Cr, and O. Preferably, the interface layer is formed of $ZrO_2$ and $Cr_2O_3$. $Cr_2O_3$ increases the crystallization speed and the reproduction durability, and $ZrO_2$ increases the transparency of the film. When the ratio of $Cr_2O_3$ is too high, the transparency of the film deteriorates, so that the transmittance of the translucent information layer is reduced. When the ratio of $ZrO_2$ is too high, the crystallization speed is reduced and the reproduction durability deteriorates. The preferred ratio of $ZrO_2$ in the interface layer is 20 mol % or more and 90 mol % or less, and the preferred ratio of $Cr_2O_3$ is 10 mol % or more and 80 mol % or less. Preferably, stabilized $ZrO_2$ containing a rare earth oxide in an amount of several mole percent is used as the above defined $ZrO_2$. $Y_2O_3$ is preferred as the rare earth oxide, and the ratio of $Y_2O_3$ in 100 mol % of the stabilized $ZrO_2$ is 2 mol % or more and 10 mol % or less. The preferred thickness of the interface layer is 2 nm or more and 10 nm or less. When the thickness is less than 2 nm, the crystallization speed is reduced and the reproduction durability deteriorates. When the thickness is greater than 10 nm, the productivity is reduced.

The second dielectric layer adjusts the optical characteristics and controls heat dissipation from the recording layer to the heat sink layer. No particular limitation is imposed on the material for the second dielectric layer, and examples of such a material include oxides, nitrides, sulfides, carbides, and fluorides containing at least one metal selected from among Ti, Zr, Hf, Ta, Si, Al, Mg, Y, Ce, Zn, In, Cr, Nb, and the like, and compositions thereof. Preferably, the second dielectric layer is formed of a mixture of ZnS and $SiO_2$. The preferred molar ratio of ZnS to $SiO_2$ is 50:50 to 95:5. When the molar ratio falls outside this range, the refractive index of the mixture of ZnS and $SiO_2$ is changed to cause difficulty in the adjustment of the optical characteristics. The thickness $D_3$ of a third dielectric layer is preferably $5\ nm \leq D_3 \leq 50\ nm$. When the thickness is less than 5 nm, a difficulty arises in the protection of the recording layer and the adjustment of the optical characteristics. When the thickness is greater than 50 nm, the heat dissipation characteristics from the recording layer to the heat sink layer are impaired.

The heat sink layer controls the heat dissipation from the recording layer and is provided for enhancing the cooling effect on the recording layer to thereby facilitate the accurate formation of the amorphous marks. A material having a thermal conductivity higher than that of the material for the third dielectric layer is preferred as the material for the heat sink layer, and AlN or SiN is preferred. The preferred thickness of the heat sink layer is determined depending on the reproduction durability and the reflectivity of the optical recording medium. For example, in a dual-layer optical recording medium, the heat sink layer is designed such that a reflectivity of approximately 5% is obtained, and the preferred reflectivity falls within the range of 3% or more and 7% or less. The reflectivity varies depending on the thicknesses of the dielectric layers, the recording film, the reflection layer, and other layers.

Figure 4:
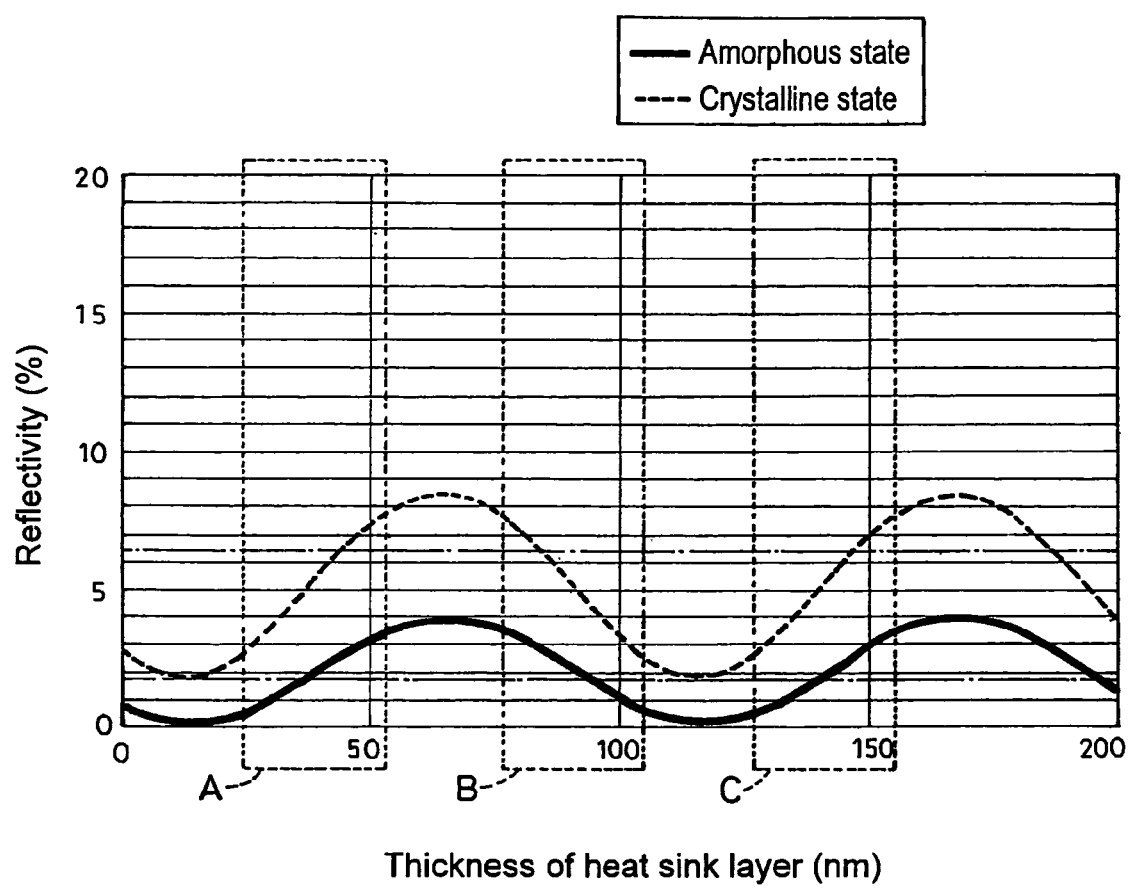
FIG. 4 is a graph showing a change in reflectivity when only the thickness of a heat sink layer of an optical recording medium is changed.

FIG. 4 is a graph showing the results of optical calculation of the reflectivity when only the thickness of the heat sink layer of the optical recording medium is changed. In FIG. 4, the horizontal axis represents the thickness (nm) of the heat sink layer, and the vertical axis represents the reflectivity (%). The solid line indicates the results when the recording film is in an amorphous state, and the broken line indicates the results when the recording film is crystallized. In the areas A, B, and C surrounded by the dotted lines in FIG. 4, the thickness of the heat sink layer falls within the ranges of 25 nm to 55 nm (A), 75 nm to 105 nm (B), and 125 nm to 155 nm (C). As shown in FIG. 4, the reflectivity assumes a sinusoidal shape with respective to the thickness of the heat sink layer due to an optical enhancement effect. The phases of the sinusoidal waves are different between the cases in which the recording film is in the amorphous state and in which the recording film is crystallized. In addition, when the thickness of the heat sink layer falls within the range B, the difference in reflectivity between the cases in which the recording film is in the amorphous state and in which the recording film is crystallized is small. Accordingly, the substantially usable ranges of the thickness of the heat sink layer are A and C, and the particularly preferred range is A. This is because, in the range C, the productivity is reduced. In terms of the material for the heat sink layer, SiN has a lower heat conductivity than AlN. Hence, when SiN is used, a sufficient heat dissipation effect is not obtained in the thickness range A, and the reproduction durability deteriorates. However, the reproduction durability comparable to that of AlN can be obtained by increasing the thickness of the heat sink layer. Moreover, since SiN can provide a higher sputtering rate than AlN, the productivity is not largely impaired even when the thickness of the heat sink layer is increased.

When the thickness of the heat sink layer is less than 15 nm, the heat dissipation effect from the recording film is reduced.

In addition, when the thickness of the heat sink layer is equal to or more than 150 nm, the time required for deposition increases, and this results in a reduction in productivity.

Note that the first and second dielectric layers may be constituted by a single dielectric layer or two or more dielectric layers.

As described above, in a multi-layer optical recording medium having two or more information layers on one side, the reproduction laser power for reading recorded signals must be high because the reflectivity of each layer is low. In addition, when the linear velocity of recording is increased in order to perform high speed recording, i.e., when the rotation speed of the disc is increased, a pickup cannot easily follow the grooves on the disc, and therefore servo control is not stabilized. Therefore, when high-speed recording is performed, the reproduction power must be increased to stabilize the servo control.

In addition, in a beam pickup of an optical disc drive, high frequency modulation is performed in order to reduce noise of the diode laser caused by reflected light.

Accordingly, the reproduction power is 0.6 mw or more and preferably 0.7 mw or more. The high frequency modulation is performed under the conditions of a frequency of 300 to 500 MHz, a Ratio of 3 to 8, and a pulse width of 200 to 400 psec.

Exemplary Embodiment 1

Hereinbelow, an optical recording medium 10 according to exemplary embodiment 1 of the present invention will be described in detail with reference to FIG. 1. In FIG. 1, a laser beam incident surface side is an upper side, i.e., the side of a cover layer 24.

This optical recording medium 10 includes: a substrate 12; a first information layer 14 which is provided on a laser beam incident surface side (the upper side in FIG. 1) of the substrate 12; and a second information layer 16 which is a translucent information layer provided on the laser beam incident surface side and is located farther away from the substrate 12 than is the first information layer 14. The second information layer 16 is configured to include a recording film 18 and a protection layer 20 provided on the substrate 12 side of the recording film 18 so as to be adjacent to the recording film 18.

A spacer layer 22 is provided between the first information layer 14 and the second information layer 16. In addition, the cover layer 24 is provided on the laser beam incident surface side of the second information layer 16.

The second information layer (translucent information layer) 16 includes: a first dielectric layer 26 formed of a $ZrO_2$—$Cr_2O_3$—$Al_2O_3$ (65:10:25 mol %) film having a thickness of 5 nm; a reflection layer 28 formed of an AgCu film having a thickness of 12 nm; the protection layer 20 formed of a $ZrO_2$—$Cr_2O_3$ (50:50 mol %) film having a thickness of 4 nm; the recording film 18 formed of an Sb-based eutectic phase change material containing Sb as a main component and having a thickness of 6 nm; an interface layer 36 formed of a $ZrO_2$—$Cr_2O_3$ (50:50 mol %) film having a thickness of 5 nm; a second dielectric layer 32 formed of a $ZnS:SiO_2$ (80:20 mol %) film having a thickness of 13 nm; and a heat sink layer 34 formed on an AlN film having a thickness of 45 nm. These layers are formed in that order from the spacer layer 22 side by means of sputtering. The $ZrO_2$ used above is stabilized $ZrO_2$ containing 3 mol % of $Y_2O_3$ (composition: $ZrO_2$:$Y_2O_3$=97:3 mol %).

The substrate 12 is formed of polycarbonate and has a thickness of 1.1 mm. The spacer layer 22 is formed to a thickness of 25 μm, and the cover layer 24 is formed of an ultraviolet curable resin and to a thickness of 75 μm by means of a spin coating method. This cover layer 24 is formed after the entire second information layer is crystallized by means of an initializer.

Optical recording medium samples 1 to 14 having the above configuration were produced. In this case, sputtering targets having the compositions shown in Table 1 were used as the recording film materials forming the recording film 18.

TABLE 1

|  | x | y | z | a |
|---|---|---|---|---|
| Sample 1 | 76.8 | 9.4 | 4.8 | 9.0 |
| Sample 2 | 74.4 | 9.1 | 7.9 | 8.6 |
| Sample 3 | 73.0 | 9.0 | 9.9 | 8.1 |
| Sample 4 | 76.7 | 10.3 | 8.0 | 4.9 |
| Sample 5 | 75.2 | 8.8 | 5.6 | 10.4 |
| Sample 6 | 81.5 | 11.7 | 4.7 | 2.2 |
| Sample 7 | 82.6 | 12.3 | 5.1 | 0.0 |
| Sample 8 | 78.0 | 9.5 | 3.0 | 9.5 |
| Sample 9 | 80.5 | 10.6 | 2.8 | 6.0 |
| Sample 10 | 70.9 | 6.7 | 5.8 | 16.5 |
| Sample 11 | 73.4 | 9.9 | 12.4 | 4.3 |
| Sample 12 | 69.0 | 8.7 | 15.2 | 7.1 |
| Sample 13 | 79.7 | 15.2 | 5.1 | 0.0 |
| Sample 14 | 90.2 | 4.7 | 5.1 | 0.0 |

In Table 1, x, y, z, and a are values representing the compositional ratio of Sb, Ge, In, and Te, respectively. When the elemental composition of the recording film material is represented by $(Sb_xGe_yIn_z)$+Te$_a$, x+y+z+a=100 is satisfied. In addition, the relationship between the amount of Te (a) and the amount of Sb (x) can be represented by the following inequalities:

$$-0.65a+80.1 \leq x \leq -0.68a+83.0, \text{ and} \quad (1)$$

$$-0.71a+78.7 \leq x \leq -0.68a+83.0. \quad (2)$$

Note that when the amount of In (z) is 4.8 at %, x=−0.68a+83.0 holds and that when the amount of In (z) is 9.7 at %, x=0.71a+78.7 holds.

Figure 2:
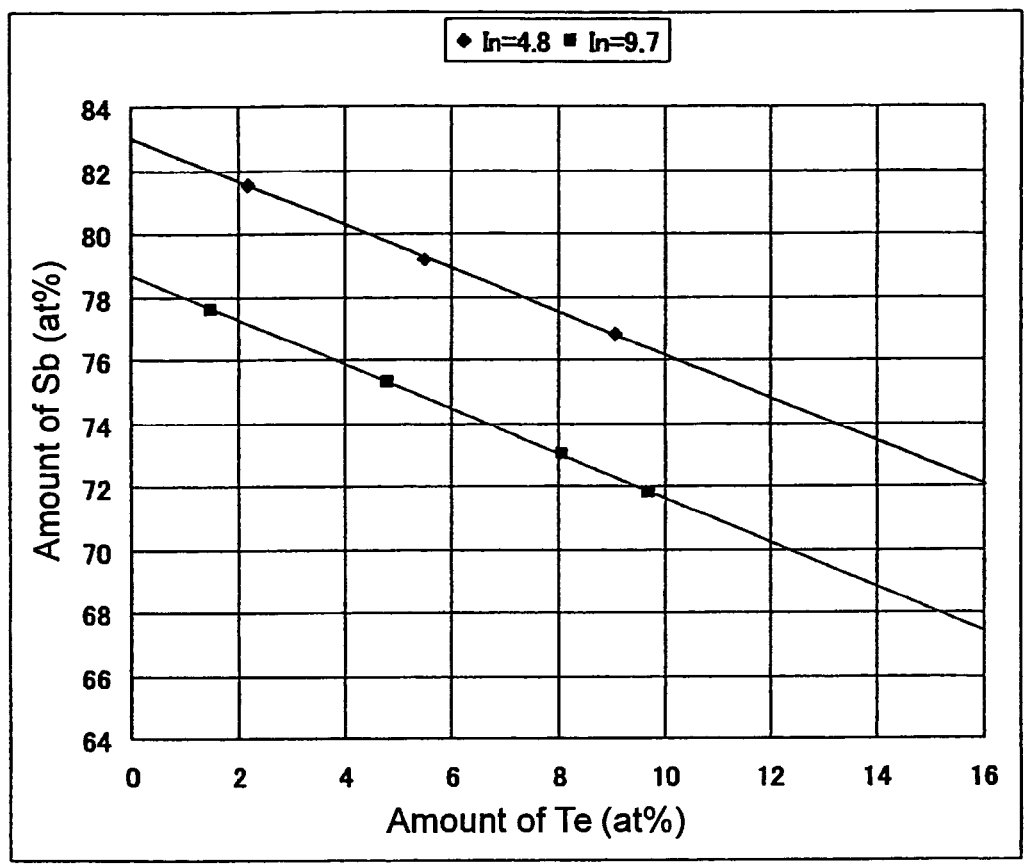
FIG. 2 is a graph showing the relationship between the amount of Te (a) and amount of Sb (x) in a translucent information layer in an optical recording medium according to an exemplary embodiment of the present invention.

FIG. 2 is a graph showing the relationship between the amount of Te (a) and the amount of Sb (x) represented by the above inequality (2). In FIG. 2, the horizontal axis represents the amount of Te (a), and the vertical axis represents the amount of Sb (x). Inequality (2) holds when a coordinate point (a, x) is located between the two lines in FIG. 2. For example, (a, x)=(6, 76), (8, 76), (10, 74), and (12, 74) satisfy inequality, (2).

These samples 1 to 14 are described. In samples 1 to 5 and 11, $5 \leq y \leq 15$, $4 \leq z \leq 15$, and $4 \leq a \leq 15$ are satisfied. In sample 1, z is close to the lower limit of the range $4 \leq z \leq 15$. In samples 4 and 11, a is close to the lower limit of the range $4 \leq a \leq 15$. In samples 6 and 7, $5 \leq y \leq 15$ and $4 \leq z \leq 15$ are satisfied, but a<4. In sample 7, a=0.0, i.e., Te is not contained. In sample 10, $5 \leq y \leq 15$ and $4 \leq z \leq 15$ are satisfied, but 15<a. In samples 8 and 9, $5 \leq y \leq 15$ and $4 \leq a \leq 15$ are satisfied, but z<4. In sample 12, $5 \leq y \leq 15$ and $4 \leq a \leq 15$ are satisfied, but 15<z. In sample 13, $4 \leq z \leq 15$ is satisfied, but 15<y and a=0.0, i.e., Te is not contained. In sample 14, $4 \leq z \leq 15$ is satisfied, but y<5 and a=0.0, i.e., Te is not contained. These relationships are shown in Table 2. If $5 \leq y \leq 15$, $4 \leq z \leq 15$, or $4 \leq a \leq 15$ is satisfied, a circle "o" is placed in the corresponding column. If y, z, or a falls outside the range, a cross "x" is placed in the corresponding column.

TABLE 2

|  | $5 \leq y \leq 15$ | $4 \leq z \leq 15$ | $4 \leq a \leq 15$ |
|---|---|---|---|
| Sample 1 | ○ | ○ | ○ |
| Sample 2 | ○ | ○ | ○ |
| Sample 3 | ○ | ○ | ○ |
| Sample 4 | ○ | ○ | ○ |
| Sample 5 | ○ | ○ | ○ |
| Sample 6 | ○ | ○ | X |
| Sample 7 | ○ | ○ | X |
| Sample 8 | ○ | X | ○ |
| Sample 9 | ○ | X | ○ |
| Sample 10 | ○ | ○ | X |
| Sample 11 | ○ | ○ | ○ |
| Sample 12 | ○ | X | ○ |
| Sample 13 | X | ○ | X |
| Sample 14 | X | ○ | X |

In order to evaluate these samples, recording and reproduction were performed by using (1, 7) RLL (Run Length Limited) signals by means of an optical system with λ=405 nm and NA=0.85. The linear velocity of the recording and reproduction was 4.92 m/s for 1× speed and 9.84 m/s for 2× speed.

Generally, in the 2× speed for a BD-RE, recording is performed at a linear velocity of 9.84 m/s. In order to erase marks at the 2× speed, the linear velocity (crystallization speed) of the medium must fall within a certain range. If the linear velocity of the medium is lower than this range, the marks cannot be erased. If the linear velocity of the medium is too fast, the formation of the marks are difficult due to recrystallization after melting for recording. Therefore, the linear velocity of the medium must be 10 m/s to 18 m/s. In the present exemplary embodiment, the linear velocity of the medium was determined, whereby evaluation of the linear velocity was made.

More specifically, only 8T marks were recorded at 1× speed or 2× speed. Then, DC erasing was preformed one time at an erasing power of 4 mW while the linear velocity was changed, and the erasing ratio of the 8T marks was determined. A maximum erasing linear velocity at which the erasing ratio is 25 dB or more was defined as the linear velocity of the medium.

The results are shown in Table 3. As described above, a sample with a linear velocity of 10 m/s to 18 m/s was evaluated as "good (represented by a circle "o")." When the linear velocity fell outside the above range, or when recording could not be performed, the sample was evaluated as "poor (represented by a cross "x.")". When the recording could not be performed on a sample, "unrecordable" was placed in the LV column in the linear velocity category. As used herein, "unrecordable" means that the crystallization speed is too fast, so that marks are difficult to be formed, i.e., the linear velocity of the medium is too fast.

TABLE 3

|  | Linear velocity | |
|---|---|---|
|  | LV (m/s) | Evaluation |
| Sample 1 | 15.0 | ○ |
| Sample 2 | 14.0 | ○ |
| Sample 3 | 11.5 | ○ |
| Sample 4 | 11.0 | ○ |
| Sample 5 | 12.5 | ○ |
| Sample 6 | 14.0 | ○ |
| Sample 7 | 13.5 | ○ |
| Sample 8 | 14.5 | ○ |
| Sample 9 | Unrecordable | X |
| Sample 10 | 5.0 | X |
| Sample 11 | 6.0 | X |
| Sample 12 | 7.7 | X |
| Sample 13 | 8.4 | X |
| Sample 14 | Unrecordable | X |

As can be seen from Table 3, at least in samples 1 to 5, i.e., in the case where the composition of the recording film material falls within the ranges of $5 \leq y \leq 15$, $4 \leq z \leq 15$, and $4 \leq a \leq 15$, the linear velocity fell within the range of 10 m/s to 18 m/s.

Next, reproduction durability was evaluated. The conditions of high frequency modulation for a reproduction beam were a frequency of 400 MHz, a Ratio of 6.5, and a pulse width of 270 psec.

First, signals were recorded at 2× speed and then were reproduced at 1× speed to measure initial jitter. Next, reproduction at 2× speed was repeated 10,000 times while the reproduction power Pr was changed. Finally, reproduction was performed at 1× speed to measure jitter, and the amount of change in jitter was determined. Table 4 shows the amount of deterioration in jitter after the reproduction was repeated 10,000 times at Pr=1.0 mW. If deterioration in jitter was not found after the reproduction was repeated 10,000 times under the conditions of 2× speed and a reproduction power Pr=0.7 mW, the sample was evaluated as "good (represented by a circle "o")." If the deterioration in jitter was found, the sample was evaluated as "poor (represented by a cross "x")."

TABLE 4

|  | Reproduction durability | |
|---|---|---|
|  | Amount of deterioration in jitter | Evaluation |
| Sample 1 | 0.8 | ○ |
| Sample 2 | 0.4 | ○ |
| Sample 3 | 0.0 | ○ |
| Sample 4 | 0.0 | ○ |
| Sample 5 | 1.8 | ○ |
| Sample 6 | >10 | X |
| Sample 7 | >10 | X |
| Sample 8 | 1.6 | ○ |
| Sample 9 | Unrecordable | X |
| Sample 10 | Unerasable | X |
| Sample 11 | Unerasable | X |
| Sample 12 | Unerasable | X |
| Sample 13 | Unerasable | X |
| Sample 14 | Unrecordable | X |

For a sample in which, after the signals were recorded at the 2× speed, erasing could not be performed since the linear velocity of the medium was low, "unerasable" was placed in the column of the amount of deterioration in jitter. For a sample in which the signals could not be recorded at the 2× speed since the linear velocity of the medium was too fast, "unrecordable" was placed in the column of the amount of deterioration in jitter. The amount of deterioration in jitter could not be determined for such samples. In addition, since the amount of deterioration in jitter was 10% or more in samples 6 and 7, ">10" was placed in the column.

As can be seen from Table 4, at least in samples 1 to 5, i.e., in the case where the composition of the recording film material falls within the ranges of $5 \leq y \leq 15$, $4 \leq z \leq 15$, and $4 \leq a \leq 15$, the reproduction durability was excellent.

Finally, jitter was measured when recording was performed at 2× speed by using different multi pulse (Tmp) widths in the recording strategy. Table 5 shows the jitter when the Tmp width was 3.375 nsec. When the jitter was 8.5% or less, the sample was evaluated as "good (represented by a circle "o")". When the jitter was more than 8.5%, the sample was evaluated as "poor (represented by a cross "x")."

TABLE 5

| | Tmp margin | |
|---|---|---|
| | Jitter (%) | Evaluation |
| Sample 1 | 7.5 | ○ |
| Sample 2 | 6.6 | ○ |
| Sample 3 | 6.8 | ○ |
| Sample 4 | 7.8 | ○ |
| Sample 5 | 8.2 | ○ |
| Sample 6 | 8.0 | ○ |
| Sample 7 | 7.8 | ○ |
| Sample 8 | 9.2 | X |
| Sample 9 | Unrecordable | X |
| Sample 10 | Unerasable | X |
| Sample 11 | Unerasable | X |
| Sample 12 | Unerasable | X |
| Sample 13 | Unerasable | X |
| Sample 14 | Unrecordable | X |

The jitter could not be measured for the unrecordable samples and the unerasable samples, and therefore "unrecordable" and "unerasable" were placed in the jitter columns, respectively.

As can be seen from Table 5, at least in samples 1 to 5, i.e., in the case where the composition of the recording film material falls within the ranges of $5 \leq y \leq 15$, $4 \leq z \leq 15$, and $4 \leq a \leq 15$, the jitter value was excellent.

Table 6 shows overall evaluation results that represent a summary of the evaluation results obtained by the respective evaluation methods. In the overall evaluation results, when all the evaluation results for the linear velocity, reproduction durability, and the Tmp margin for jitter were "good," the sample was evaluated as "good (represented by a circle "o")." If any of the results was "poor," the sample was evaluated as "poor (represented by a cross "x")."

TABLE 6

| | Linear velocity | Reproduction durability | Tmp margin | Overall evaluation |
|---|---|---|---|---|
| Sample 1 | ○ | ○ | ○ | ○ |
| Sample 2 | ○ | ○ | ○ | ○ |
| Sample 3 | ○ | ○ | ○ | ○ |
| Sample 4 | ○ | ○ | ○ | ○ |
| Sample 5 | ○ | ○ | ○ | ○ |
| Sample 6 | ○ | X | ○ | X |
| Sample 7 | ○ | X | ○ | X |
| Sample 8 | ○ | ○ | X | X |
| Sample 9 | X | X | X | X |
| Sample 10 | X | X | X | X |
| Sample 11 | X | X | X | X |
| Sample 12 | X | X | X | X |
| Sample 13 | X | X | X | X |
| Sample 14 | X | X | X | X |

As can be seen from Table 6, in samples 1 to 5, i.e., in the case where the composition of the recording film material falls within the ranges of $5 \leq y \leq 15$, $4 \leq z \leq 15$, and $4 \leq a \leq 15$, a next generation optical recording medium can be realized which is excellent in reproduction durability and has a wide margin for recording strategy.

As can be seen from the above, the following facts are revealed: When the value of a is small, the reproduction durability deteriorates. When the value of a is too large, the erasing ratio is reduced, so that rewriting cannot be performed at 2× speed. Moreover, when the value of y is small, the crystallization speed is too fast, so that the marks are difficult to be formed at 2× speed. When the value of y is too large, the erasing ratio is reduced, so that rewriting cannot be performed at 2× speed. In addition, when the value of z is small, the Tmp margin deteriorates. When the value of z is too large, the erasing ratio is reduced, so that rewriting cannot be performed at 2× speed.

Figure 3:
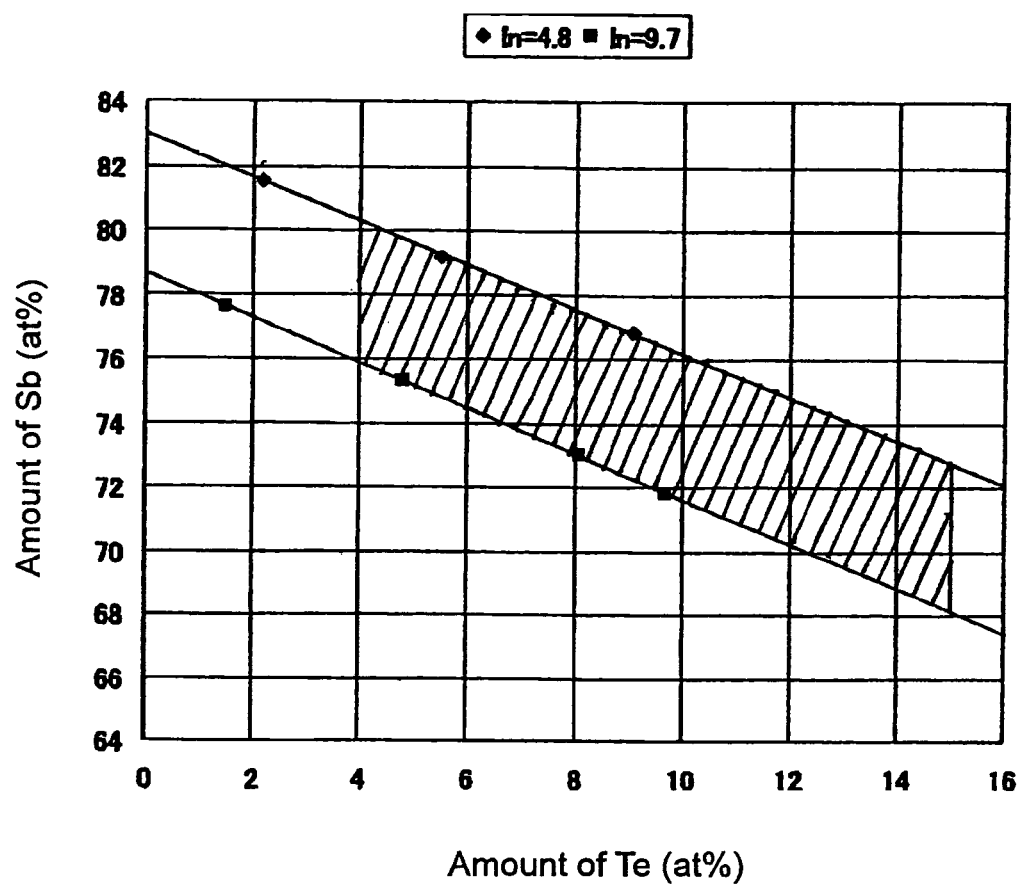
FIG. 3 is a graph showing the relationship between the amount of Te (a) and amount of Sb (x) in the translucent information layer in the optical recording medium according to the exemplary embodiment of the present invention, the relationship being shown in the range of $4 \leq a \leq 15$.

FIG. 3 shows the area in which the value of a falls within the range of $4 \leq a \leq 15$ in the graph shown in FIG. 2 showing the relationship between the amount of Te (a) and the amount of Sb (x). As in FIG. 2, in FIG. 3, the horizontal axis represents the amount of Te (a), and the vertical axis represents the amount of Sb (x). The area within the range of $4 \leq a \leq 15$ is diagonally shaded in FIG. 3.

Exemplary Embodiment 2

The reproduction durability was evaluated for sample 7 of exemplary embodiment 1. The conditions of high frequency modulation for a reproduction beam were a frequency of 400 MHz, a Ratio of 6.0, and a pulse width of 220 psec. The width of the Ratio and the pulse width in this case were smaller than those of the conditions of high frequency modulation in exemplary embodiment 1. Even after reproduction was repeated 10,000 times under the conditions of 2× speed and a reproduction power Pr=0.7 mw, deterioration in the jitter value was not found.

Accordingly, when the width of the Ratio and the pulse width in high frequency modulation are small, deterioration in reproduction does not occur. However, the effect on the returning beam to the diode laser becomes large, so that laser oscillation becomes unstable.

Comparative Example 1

Sample 2 of exemplary embodiment 1 and sample 15 which had the same recording film composition as that of sample 2 of exemplary embodiment 1 were produced. In sample 15, the heat sink layer 34 formed of the AlN film having a thickness of 45 nm was not provided, and the second dielectric layer 32 formed of the ZnS—SiO$_2$ (80:20 mol %) film was formed to a thickness of 40 nm. Moreover, sample 16 was produced in which a heat sink layer formed of an SiN film having a thickness of 45 nm was provided in place of the heat sink layer 34 formed of the AlN film having a thickness of 45 nm. In addition, sample A was produced which had the same recording film composition as that of sample 2 of exemplary embodiment 1 and in which a heat sink layer formed of an SiN film having a thickness of 140 nm was provided in place of the heat sink layer 34 formed of the AlN film having a thickness of 45 nm. The linear velocity of each of these samples was determined by means of the same method as in exemplary embodiment 1. The results show that the linear velocities of samples 15, 16, and A were the same as that of sample 2. Furthermore, reproduction durability was evaluated by means of the same method as in exemplary embodiment 1. Table 7 shows the amount of deterioration in jitter after the reproduction was repeated 10,000 times at Pr=1.0 mW. When deterioration in jitter was not found after the reproduction was repeated 10,000 times under the conditions of 2× speed and Pr=1.0 mW, the sample was evaluated as "good (represented by a circle "o")." When the deterioration in jitter was found, the sample was evaluated as "poor (represented by a cross "x")." Since the heat sink layer was not provided in sample 15, the thickness of the ZnS—SiO$_2$ (80:20 mol %) film was placed in the thickness column.

TABLE 7

|  | Heat sink layer | Thickness (nm) | Amount of deterioration in jitter (%) | Evaluation |
|---|---|---|---|---|
| Sample 2 | AlN | 45 | 0.4 | ○ |
| Sample 15 | None | 40 | Signals lost | X |
| Sample 16 | SiN | 45 | 4.0 | X |
| Sample A | SiN | 140 | 0.6 | ○ |

In sample 15 in which the heat sink layer was not provided, the amorphous marks were crystallized when the reproduction was repeated 10,000 times at 2× speed and Pr=1.0 mW, so that the signals were lost. Therefore, "signals lost" was placed in the column of the amount of deterioration in jitter. Furthermore, in sample 15, the deterioration in jitter was found even after reproduction was repeated 10,000 times at 2× speed and Pr=0.7 mW. In sample 16 in which the heat sink layer formed of the SiN film having a thickness of 45 nm was provided, the amount of deterioration in jitter was large, i.e., 4%, and deterioration in reproduction was significant. However, in sample 2 in which the heat sink layer formed of the AlN film having a thickness of 45 nm was provided, the amount of deterioration in jitter was small, i.e., 0.4%. In addition, in sample A in which the heat sink layer formed of the SiN film having a thickness of 140 nm was provided, the amount of deterioration in jitter was small, i.e., 0.6%. Therefore, these samples were evaluated as "good (represented by a circle "o")."

Therefore, it is clear that the presence of the heat sink layer 34 formed of the AlN film greatly affects the reproduction durability, and it has been found that the heat sink layer 34 is absolutely necessary in the second information layer 16, which is a translucent information layer. Furthermore, when a heat sink layer formed of an SiN film is provided, the thickness of the SiN film must be increased sufficiently.

Exemplary Embodiment 3

Samples 17 to 21 were produce which had the same recording film composition as that of sample 2 of exemplary embodiment 1. In samples 17 to 21, the thickness of the ZrO$_2$—Cr$_2$O$_3$ (50:50 mol %) film constituting the interface layer 36 of the optical recording medium 10 was changed. The linear velocity of each of these samples was determined by means of the same method as in exemplary embodiment 1. Furthermore, reproduction durability was evaluated by means of the same method as in exemplary embodiment 1, i.e., the reproduction was repeated 10,000 times under the conditions of 2× speed and Pr=0.7 mW. When the deterioration in jitter was not found, the sample was evaluated as "good (represented by a circle "o")." When the deterioration in jitter was found, the sample was evaluated as "poor (represented by a cross "x")." The results are shown in Table 8.

TABLE 8

|  | Thickness of interface layer (nm) | Linear velocity (m/s) | Reproduction durability |
|---|---|---|---|
| Sample 17 | 0 | 9.4 | Unerasable |
| Sample 18 | 1 | 13.4 | X |
| Sample 19 | 2 | 13.8 | ○ |
| Sample 20 | 3 | 14.0 | ○ |
| Sample 21 | 10 | 15.0 | ○ |

As listed in Table 8, in sample 17 in which the thickness of the interface was 0 nm, i.e., the interface layer was not provided, the linear velocity was low, so that the amorphous marks were difficult to be erased at 2× speed. Therefore, the reproduction durability could not be evaluated, and "unerasable" was placed in the reproduction durability column. In sample 18 in which the thickness of the interface layer was 1 nm, the crystallization speed was improved, so that a linear velocity allowing erasing at 2× speed could be ensured. However, the deterioration in jitter was found. In sample 19, the thickness of the interface layer was 2 nm. In sample 20, the thickness of the interface layer was 3 nm. In sample 21, the thickness of the interface layer was 10 nm. In samples 19 to 21, the deterioration in jitter was not found. Accordingly, the thickness of the interface layer 36 at which both sufficient reproduction durability and a linear velocity allowing erasing can be achieved is 2 nm or more. Moreover, the upper limit of the thickness of the interface layer 36 is 10 nm, in terms of deposition time and mass productivity.

As is clear from the above results, the use of only the recording film having a composition including In, Sb, Te, and Ge is insufficient to allow the crystallization speed and reproduction durability of the second information layer 16 to be adaptable to recording and reproduction at 2× speed.

Exemplary Embodiment 4

Samples 22 to 25 were produced which had the same recording film composition as that of sample 2 of exemplary embodiment 1. In samples 22 and 25, the interface layer 36 of the optical recording medium 10 was formed to a thickness of 5 nm, and the compositional ratio of the ZrO$_2$—Cr$_2$O$_3$ film constituting the interface layer 36 was changed. The linear velocity of each of these samples was determined by means of the same method as in exemplary embodiment 1. The linear velocity of each of the samples was 12 m/s or more, and erasing could be performed at 2× speed. Furthermore, reproduction durability was evaluated by means of the same method as in exemplary embodiment 1, i.e., the reproduction was repeated 10,000 times under the conditions of 2× speed and Pr=0.7 mW. When the deterioration in jitter was not found, the sample was evaluated as "good (represented by a circle "o")." When the deterioration in jitter was found, the sample was evaluated as "poor (represented by a cross "x")." The results are shown in Table 9.

TABLE 9

|  | ZrO$_2$:Cr$_2$O$_3$ (mol %) | Reproduction durability |
|---|---|---|
| Sample 22 | 100:0 | X |
| Sample 23 | 90:10 | ○ |
| Sample 24 | 20:80 | ○ |
| Sample 25 | 0:100 | Film defects significant |

As listed in Table 9, in sample 22 in which ZrO$_2$:Cr$_2$O$_3$=100:0, i.e., an interface layer 36 formed only of ZrO$_2$ is provided, the deterioration in reproduction was found. Furthermore, in sample 25 in which ZrO$_2$:Cr$_2$O$_3$=0:100, i.e., an interface layer 36 formed only of Cr$_2$O$_3$ is provided, a significant number of film defects were found. Therefore, "film defects significant" was placed in the reproduction durability column. It is considered that this sample 25 is practically problematic. In addition, in sample 23 in which the interface layer 36 had a composition of ZrO$_2$:Cr$_2$O$_3$=90:10, and in sample 24 in which the interface layer 36 had a composition of $ZrO_2:Cr_2O_3=20:80$, the deterioration in reproduction was not found.

Accordingly, it has been found that the preferred compositional ratio of the $ZrO_2$—$Cr_2O_3$ film constituting the interface layer 36 satisfies $20 \leq B \leq 90$, $10 \leq C \leq 80$, and $B+C=100$, wherein B and C are defined as $ZrO_2:Cr_2O_3=B:C$ (mol %).

Exemplary Embodiment 5

Samples 26 to 30 were produced which had the same recording film composition as that of sample 2 of exemplary embodiment 1 and in which the thickness of the reflection layer 28 of the optical recording medium 10 was changed. The Tmp margin and reproduction durability of each of the samples were determined by means of the same method as in exemplary embodiment 1 and were evaluated. The results are shown in Table 10.

TABLE 10

|  | Thickness (nm) | Tmp margin | Reproduction durability |
| --- | --- | --- | --- |
| Sample 26 | 6 | X | ○ |
| Sample 27 | 8 | ○ | ○ |
| Sample 28 | 12 | ○ | ○ |
| Sample 29 | 16 | ○ | ○ |
| Sample 30 | 20 | ○ | X |

As listed in Table 10, in sample 26 in which the thickness of the reflection layer was 6 nm, the transmittance was high and the reproduction durability was excellent, since the thickness of the reflection layer was small. However, the heat dissipation characteristics were impaired, and the Tmp margin was "poor." In sample 30 in which the thickness of the reflection layer was 20 nm, the heat dissipation characteristics were good, and the Tmp margin was excellent. However, the transmittance was reduced, and the reproduction durability was "poor." In addition, the recording characteristics of the L0 layer were poor. In sample 27, the thickness of the reflection layer was 8 nm. In sample 28, the thickness of the reflection layer was 12 nm. In sample 29, the thickness of the reflection layer was 16 nm. In samples 27 to 29, both the Tmp margin and reproduction durability were "good."

Accordingly, it has been found that in order to obtain good Tmp margin and also good reproduction durability, the thickness of the reflection layer must be controlled.

As has been described, according to the present invention, reproduction durability under irradiation with a reproduction beam having a high reproduction power and subjected to high frequency modulation at a high Ratio and a wide pulse width can be improved when an optical system with a laser wavelength λ of 405 nm and a NA of an objective lens of 0.85 is used.

In the above exemplary embodiments, the samples were produced in which the thickness of the laser beam incident surface side interface layer 36 in contact with the recording film 18 was changed or in which the compositional ratio of the $ZrO_2$—$Cr_2O_3$ film constituting the interface layer 36 on the laser beam incident surface side of the recording film 18 was changed. However, the interface layer 36 may be provided on both sides of the recording film 18. In this case, the thickness and the compositional ratio of the $ZrO_2$—$Cr_2O_3$ film may be changed only in one of the interface layers 36. Alternatively, the thickness and the compositional ratio may be changed in both the interface layers 36.

Moreover, in the optical recording media according to the exemplary embodiments of the present invention, the interface layer 36 may be provided only on the substrate 12 side of the recording film 18.

The above exemplary embodiments relate to the optical recording media having two information layers and to the recording film materials used for these optical recording media, but the present invention is not limited thereto. The invention is applicable to optical recording media having 3 or more information layers and to recording film materials for these optical recording media.

What is claimed is:

1. An optical recording medium, comprising:
a substrate;
a first information layer provided on a laser beam incident surface side of the substrate; and
at least one translucent information layer provided on the laser beam incident surface side being located farther away from the substrate than the first information layer, the translucent information layer being configured to include a recording film comprising a phase change material $Sb_xGe_yIn_z$ containing Sb as a main component, Ge, and In in an atomic ratio of x:y:z, $5 \leq y \leq 15$ and $4 \leq z \leq 15$ being satisfied, the recording film being rewritable through phase change between a crystalline state and an amorphous state, the phase change being caused by using an optical system with λ/NA≦500 nm, where NA is a numerical aperture of an objective lens and λ is a wavelength of a laser beam, wherein
the translucent information layer is configured to include a heat sink layer, a dielectric layer, an interface layer, the recording film, and a reflection layer which are formed in that order from the laser beam incident surface side,
the recording film further comprises Te in an atomic ratio of a, provided that $x+y+z+a=100$ and $4 \leq a \leq 15$ are satisfied,
the dielectric layer is formed of a mixture of ZnS and $SiO_2$, the molar ratio of ZnS to $SiO_2$ being 50:50 to 95:5,
the interface layer is formed of a $ZrO_2$—$Cr_2O_3$ film, a thickness of the $ZrO_2$—$Cr_2O_3$ film being 2 nm or more and 10 nm or less,
when a compositional ratio of the $ZrO_2$—$Cr_2O_3$ film is given by $ZrO_2:CrO_3=B:C$ (mol %), $20 \leq B \leq 90$, $10 \leq C \leq 80$, and $B+C=100$ are satisfied, the $ZrO_2$ is stabilized $ZrO_2$ containing $Y_2O_3$ and
when a compositional ratio of $ZrO_2$ and $Y_2O_3$ in the stabilized $ZrO_2$ is given by $ZrO_2:Y_2O_3=(100-b):b$ (mol %), $2 \leq b \leq 10$ is satisfied.

2. The optical recording medium according to claim 1, wherein a thickness of the recording film is 3 nm or more and 7 nm or less.

3. The optical recording medium according to claim 1, wherein the reflection layer is formed on the laser beam incident surface side of the recording film and on the side opposite to the laser beam incident surface side and wherein thicknesses of the reflection layers are 8 nm or more and 16 nm or less.

4. The optical recording medium according to claim 2, wherein the reflection layer is formed on the laser beam incident surface side of the recording film and on the side opposite to the laser beam incident surface side and wherein thicknesses of the reflection layers are 8 nm or more and 16 nm or less.

5. The optical recording medium according to claim 1, wherein the translucent information layer is configured to include a first dielectric layer, the reflection layer, a protection layer, the recording film, the interface layer, a second dielectric layer and the heat sink layer, which are formed in that order from the substrate.

6. An optical recording medium, comprising:

a substrate;

a first information layer provided on a laser beam incident surface side of the substrate; and at least one translucent information layer provided on the laser beam incident surface side and being located farther away from the substrate than the first information layer, the translucent information layer being configured to include a heat sink layer, a dielectric layer, an interface layer, a recording film, and a reflection layer which are formed in that order from the laser beam incident surface side, the recording film is rewritable through phase change between a crystalline state and an amorphous state, the phase change being caused by using an optical system with $\lambda/NA \leqq 500$ nm, where NA is a numerical aperture of an objective lens and $\lambda$ is a wavelength of a laser beam; and the protection layer in contact with a substrate side of the recording film, wherein the recording film is formed of an Sb-based eutectic phase change material containing Sb as a main component, and wherein the protection layer contains at least Cr and O, the dielectric layer is formed of a mixture of ZnS and $SiO_2$, the molar ratio of ZnS to $SiO_2$ being 50:50 to 95:5, the interface layer is formed of a $ZrO_2$—$Cr_2O_3$ film, a thickness of the $ZrO_2$—$Cr_2O_3$ film being 2 nm or more and 10 nm or less, when a compositional ratio of the $ZrO_2$—$Cr_2O_3$ film is given by $ZrO_2$:$Cr_2O_3$=B:C (mol %), $20 \leqq B \leqq 90$, $10 \leqq C \leqq 80$, and $B+C=100$ are satisfied, the $ZrO_2$ is stabilized $ZrO_2$ containing $Y_2O_3$ and when a compositional ratio of $ZrO_7$ and $Y_2O_3$ in the stabilized $ZrO_2$ is given by $ZrO_2$:$Y_2O_3$=(100−b):b (mol %), $2 \leqq b \leqq 10$ is satisfied.

7. The optical recording medium according to claim 6, wherein the translucent information layer is configured to include a first dielectric layer, the reflection layer, the protection layer, the recording film, the interface layer, a second dielectric layer and the heat sink layer, which are formed in that order from the substrate.

* * * * *